US008567753B1

(12) United States Patent
Gilstad et al.

(10) Patent No.: US 8,567,753 B1
(45) Date of Patent: *Oct. 29, 2013

(54) TUNABLE VALVE ASSEMBLY

(71) Applicants: Dennis W. Gilstad, San Antonio, TX (US); Barbara C. Gilstad, San Antonio, TX (US)

(72) Inventors: Dennis W. Gilstad, San Antonio, TX (US); Barbara C. Gilstad, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/711,644

(22) Filed: Dec. 12, 2012

Related U.S. Application Data

(63) Continuation-in-part of application No. 13/296,251, filed on Nov. 15, 2011, now abandoned, and a continuation-in-part of application No. 13/228,475, filed on Sep. 9, 2011, and a continuation-in-part of application No. 13/228,474, filed on Sep. 9, 2011, now abandoned, and a continuation-in-part of application No. 13/210,407, filed on Aug. 16, 2011, now Pat. No. 8,292,260, and a continuation-in-part of application No. 13/196,916, filed on Aug. 3, 2011, now Pat. No. 8,267,371, and a continuation-in-part of application No. 13/616,098, filed on Sep. 14, 2012, now Pat. No. 8,403,337, and a continuation-in-part of application No. 13/525,391, filed on Jun. 18, 2012, now Pat. No. 8,292,301, and a continuation-in-part of application No. 13/456,235, filed on Apr. 26, 2012, now Pat. No. 8,276,918, and a continuation-in-part of application No. 13/184,965, filed on Jul. 18, 2011, now Pat. No. 8,210,542.

(51) Int. Cl.
*F16K 31/00* (2006.01)

(52) U.S. Cl.
USPC .............. 251/64; 251/334; 251/80; 251/318; 251/12; 251/367; 137/516.29; 137/902

(58) Field of Classification Search
USPC ............. 251/366–367, 356–358, 12, 48, 318, 251/77, 80, 120, 332–334, 64; 137/516.29, 137/902
See application file for complete search history.

(56) References Cited

U.S. PATENT DOCUMENTS

| 767,118 A | 8/1904 | Popham et al. |
| 829,546 A * | 8/1906 | Schou, P. ...................... 277/538 |
| 1,705,800 A | 3/1929 | Akeyson |
| 1,716,896 A | 6/1929 | Miller |

(Continued)

OTHER PUBLICATIONS

Introduction to Impulse Hammers, internet download Sep. 2011 from Dytran Instruments, Inc.

*Primary Examiner* — John K Fristoe, Jr.
*Assistant Examiner* — Marina Tietjen
(74) *Attorney, Agent, or Firm* — Dennis W. Gilstad

(57) ABSTRACT

A tunable valve assembly comprises a valve body, an adjustable preload flange centrally coupled to the valve body, and a viscoelastic element; the assembly attenuates valve-generated vibration transmitted to a pump housing. The vibration spectrum is narrowed and its amplitude reduced through hysteresis loss of closing impulse energy. The viscoelastic element comprises a peripheral groove portion coupled to a central reservoir portion via a plurality of fenestration portions. At least a first predetermined assembly resonant frequency is achieved by changing valve assembly compliance (with associated hysteresis loss) through adjustment of annular shear preload applied by the flange to the viscoelastic element reservoir portion. Such preload adjustment effectively maximizes hysteresis loss at the resonant frequency. At least a second predetermined assembly resonant frequency is achieved through choice of a circumferential shear-thickening material within the viscoelastic element groove portion. Assembly resonant frequencies are chosen to approximate pump housing resonant frequencies.

11 Claims, 5 Drawing Sheets

(56) References Cited

U.S. PATENT DOCUMENTS

| | | | | |
|---|---|---|---|---|
| 1,733,180 | A | 10/1929 | Biedermann | |
| 2,002,672 | A | 5/1935 | Melott | |
| 2,011,547 | A | 8/1935 | Campbell | |
| 2,018,288 | A | 10/1935 | Steirly | |
| 2,178,876 | A | 11/1939 | MacClatchie | |
| 2,298,632 | A | 10/1942 | Thorner | |
| 2,329,576 | A | 9/1943 | Anderson | |
| 2,446,196 | A | 8/1948 | Sitney | |
| 2,792,016 | A * | 5/1957 | Shellman et al. | 137/516.29 |
| 3,004,633 | A | 10/1961 | Hobson | |
| 3,053,500 | A | 9/1962 | Atkinson | |
| 3,053,501 | A | 9/1962 | Varga | |
| 3,054,422 | A | 9/1962 | Napolitano | |
| 3,540,472 | A | 11/1970 | Brady et al. | |
| 3,617,589 | A | 11/1971 | Jones-Hinton et al. | |
| 3,951,849 | A | 4/1976 | Vickery et al. | |
| 4,088,301 | A | 5/1978 | Ehmig | |
| 4,103,909 | A | 8/1978 | Hoffman et al. | |
| 4,181,027 | A | 1/1980 | Talbott, Jr. | |
| 4,254,792 | A | 3/1981 | Schadel | |
| 4,269,419 | A | 5/1981 | Brant | |
| 4,300,775 | A | 11/1981 | Ringel | |
| 4,572,519 | A | 2/1986 | Cameron et al. | |
| 4,687,421 | A | 8/1987 | Cameron et al. | |
| 4,759,428 | A | 7/1988 | Seshimo | |
| 4,852,533 | A | 8/1989 | Doncker et al. | |
| 4,860,995 | A | 8/1989 | Rogers | |
| 4,951,707 | A | 8/1990 | Johnson | |
| 5,073,096 | A | 12/1991 | King et al. | |
| 5,088,521 | A | 2/1992 | Johnson | |
| 5,091,455 | A | 2/1992 | Blank et al. | |
| 5,158,162 | A | 10/1992 | Fink et al. | |
| 5,183,863 | A | 2/1993 | Nakamura et al. | |
| 5,226,445 | A | 7/1993 | Surjaatmadja | |
| 5,238,744 | A | 8/1993 | Williams et al. | |
| 5,249,600 | A | 10/1993 | Blume | |
| 5,262,232 | A * | 11/1993 | Wilfong et al. | 428/327 |
| 5,275,204 | A | 1/1994 | Rogers et al. | |
| 5,370,150 | A | 12/1994 | Nehm | |
| 5,431,186 | A | 7/1995 | Blume | |
| 5,580,068 | A | 12/1996 | Gundy | |
| 5,629,503 | A | 5/1997 | Thomasen | |
| 5,639,098 | A | 6/1997 | MacDonald | |
| 5,670,006 | A | 9/1997 | Wilfong et al. | |
| 5,799,953 | A | 9/1998 | Henderson | |
| 5,979,242 | A | 11/1999 | Hobbs | |
| 6,000,677 | A | 12/1999 | Cook et al. | |
| 6,026,776 | A | 2/2000 | Winberg | |
| 6,056,270 | A | 5/2000 | Zimmerly | |
| 6,290,205 | B1 | 9/2001 | Haga et al. | |
| 6,331,578 | B1 | 12/2001 | Turner et al. | |
| 6,432,320 | B1 | 8/2002 | Bonsignore et al. | |
| 6,701,529 | B1 | 3/2004 | Rhoades et al. | |
| 6,713,438 | B1 | 3/2004 | Baillargeon et al. | |
| 6,959,727 | B2 | 11/2005 | Krishnamoorthy et al. | |
| 7,081,223 | B2 | 7/2006 | Khoury | |
| 7,222,837 | B1 | 5/2007 | Blume | |
| 7,287,545 | B2 | 10/2007 | Zelson | |
| 7,429,220 | B2 | 9/2008 | Kuntimaddi et al. | |
| 7,513,483 | B1 | 4/2009 | Blume | |
| 7,513,759 | B1 | 4/2009 | Blume | |
| 7,591,450 | B1 | 9/2009 | Blume | |
| 7,608,314 | B2 | 10/2009 | Plant | |
| 7,794,827 | B2 | 9/2010 | Palmer et al. | |
| 7,847,057 | B2 | 12/2010 | Muller et al. | |
| 7,942,603 | B2 | 5/2011 | Miller | |
| 2004/0226616 | A1 | 11/2004 | Vicars | |
| 2005/0084229 | A1 | 4/2005 | Babbitt et al. | |
| 2005/0206096 | A1 * | 9/2005 | Browne et al. | 277/628 |
| 2007/0025811 | A1 | 2/2007 | Wilhelm | |
| 2007/0138423 | A1 | 6/2007 | Smith | |
| 2008/0279706 | A1 * | 11/2008 | Gambier et al. | 417/455 |
| 2011/0240064 | A1 | 10/2011 | Wales et al. | |
| 2012/0035309 | A1 * | 2/2012 | Zhu et al. | 524/296 |

* cited by examiner

TUNABLE VALVE ASSEMBLY

This application is a continuation-in-part of copending application Ser. No. 13/296,251, filed 15 Nov. 2011, which is a continuation-in-part of copending application Ser. No. 13/228,475, filed 9 Sep. 2011, which is a continuation-in-part of copending application Ser. No. 13/228,474, filed 9 Sep. 2011, which was a continuation-in-part of application Ser. No. 13/210,407, filed 16 Aug. 2011 (now U.S. Pat. No. 8,292,260 B1, issued 23 Oct. 2012), which was a continuation-in-part of application Ser. No. 13/196,916, filed 3 Aug. 2011 (now U.S. Pat. No. 8,267,371 B1, issued 18 Sep. 2012), all incorporated by reference.

This application is also a continuation-in-part of copending application Ser. No. 13/616,098, filed 14 Sep. 2012, which is a continuation-in-part of application Ser. No. 13/525,391, filed 18 Jun. 2012 (now U.S. Pat. No. 8,292,301 B1 issued 23 Oct. 2012), which was a continuation-in-part of application Ser. No. 13/456,235, filed 26 Apr. 2012 (now U.S. Pat. No. 8,276,918 B1, issued 2 Oct. 2012) which was a continuation-in-part of application Ser. No. 13/184,965, filed 18 Jul. 2011 (now U.S. Pat. No. 8,210,542 B1, issued 3 Jul. 2012), all incorporated by reference.

FIELD OF THE INVENTION

The invention relates generally to reciprocating high-pressure pumps, and more specifically to the valves of such pumps.

BACKGROUND

Reciprocating high-pressure pumps used in oil and gas fields, particularly those intended for hydraulic fracturing of rock formations, are usually designed in two sections. The (proximal) power section (herein "power end") and the (distal) fluid section (herein "fluid end") are often truck-mounted for easy relocation from well-to-well. The fluid end comprises a housing incorporating one or more functional units, each functional unit typically comprising a suction valve, a discharge valve, and a plunger or piston bore in which a reciprocating plunger or piston alternately produces suction strokes and pressure strokes. Such pumps are operated at peak pumped-fluid pressures in current practice up to about 15,000 psi, while simultaneously being weight-limited due to the carrying capacity of the trucks on which they are mounted. See, e.g., U.S. Pat. No. 7,513,759 B1, incorporated by reference.

Due to high peak pumped-fluid pressures, suction valves experience wide pressure variations between a suction stroke, when the valve opens, and a pressure stroke, when the valve closes. For example, during a pressure stroke a valve body may be driven toward contact with its corresponding valve seat with total valve closing force that may vary from about 50,000 to over 150,000 pounds (depending on pumped-fluid pressure and valve body area). Valve closure impact energy, in the form of a short-duration high-amplitude impulse, is thus applied longitudinally to the proximal surfaces of the valve. Since little of this energy is dissipated in a conventional valve, it is necessarily transmitted, in the form of vibration, to the pump housing via the valve seat. As described below, the vibration-generation effect is analogous to striking the valve seat with an impulse hammer.

Valve closure impact is particularly prominent when a conventionally-stiff valve body contacts a conventional frusto-conical valve seat. The valve body's longitudinal movement typically stops abruptly, together with the associated longitudinal movement of a proximal mass of pressurized fluid in contact with the valve body. The kinetic energy of the moving valve body and pressurized fluid is thus nearly instantly converted to a high-amplitude closing energy impulse of short duration. The effect may be compared to that of a commercially-available impulse hammer configured to produce broad-spectrum high-frequency excitation (i.e., vibration) in an object struck by the hammer.

Thus, broad-spectrum high-frequency vibration characteristically results from the closing impulse energy of a conventionally-stiff valve body contacting a conventional frusto-conical valve seat. This vibration is quickly transmitted via the valve seat to adjacent areas of the pump housing, where it can be expected to excite damaging resonances within adjacent pump housing structures. See, e.g., U.S. Pat. No. 5,979,242, incorporated by reference. Maintenance costs are well-known in the industry to be relatively high and growing, due to both rapid valve wear and the early emergence of structurally significant cracks in the pump housing (particularly near the suction valve seat).

Proposed valve designs in the past have included relatively lighter valve bodies comprising one or a plurality of interior cavities. See, e.g., U.S. Pat. No. 7,222,837 B1, incorporated by reference. Notwithstanding the somewhat lower closing energy impulse amplitudes theoretically associated with such lighter valve bodies, they have been less popular than heavier and substantially more rigid valve bodies. The latter valve bodies have historically been relatively durable, but that performance record was largely created in lower pressure applications where the vibration issues described above are less prominent.

The present transition period from lower pressure pump operations to higher pressures might be compared to the transition from slow-turning two-cylinder automobile engines to higher-speed and higher-powered inline six-cylinder engines around the years 1903-1910. New engine failure modes became evident, though they were neither anticipated nor understood at the time. Whereas the earlier engines had been under-powered but relatively reliable, torsional crankshaft vibrations in the six-cylinder engines caused objectionable noise ("octaves of chatter from the quivering crankshaft") and unexpected catastrophic failures (e.g., broken crankshafts). (Quotation cited on p. 13 of Royce and the Vibration Damper, Rolls-Royce Heritage Trust, 2003). The vibration problems, though never entirely eliminated, were finally reduced to manageable levels after several crankshaft redesigns and the development of crankshaft vibration dampers by Royce and Lanchester.

Analogously, new (and weight-sparing) valve designs directed to reducing the adverse vibration-related effects of repeatedly-applied closing energy impulses are needed now. The need is prompted by pump failures associated with fatigue and the induction of destructive vibration resonances in valves, housings, and related structures.

SUMMARY OF THE INVENTION

Each embodiment of a tunable valve assembly attenuates valve-generated vibration transmitted to a pump housing in which the assembly is installed. The transmitted vibration spectrum is narrowed and its amplitude reduced through absorption and dissipation of closing impulse energy via a plurality of valve assembly structural features.

A tunable valve assembly embodiment comprises a valve body substantially symmetrical about a longitudinal axis, the valve body having a peripheral groove coupled (e.g., via fenestrations in the groove wall) to a central reservoir. The reservoir is an annular space surrounding a central (longitudinal) guide stem. An adjustable preload flange is coupled centrally to the valve body (e.g., to the guide stem). A viscoelastic element is integrated with the valve body, having (peripheral) groove and (central) reservoir portions (and, in certain embodiments, fenestration portions) residing substantially in corresponding structures of the valve body.

Closing impulse energy absorption in a tunable valve assembly arises from hysteresis loss (e.g., heat loss) at one or more predetermined assembly resonant frequencies. Such losses are primarily in the groove and/or reservoir portions of the viscoelastic element, but may also occur in the fenestration portions (where present) and in the valve body itself. Hysteresis loss beneficially reduces closing impulse amplitude and damps induced vibration resonances.

Predetermined vibration spectrum narrowing is achieved in part by changing tunable valve assembly compliance (with its associated hysteresis loss). Such compliance changes are achieved through adjustment of annular constraint (e.g., compression) applied substantially longitudinally by the adjustable preload flange to an annular constrained region of the viscoelastic element's reservoir portion. Adjacent to the annular constrained region is another annular region of the viscoelastic element which is not in contact with the adjustable preload flange (i.e., an annular unconstrained region). This annular unconstrained region is open to pumped fluid pressure.

As shown by the schematic illustrations herein, preload flange adjustment changes compressive restraint applied to the annular region of the viscoelastic element reservoir portion in contact with the preload flange. The result is substantially countercurrent viscoelastic strain (i.e., movement in shear) relative to the annular unconstrained region. Energy lost (i.e., dissipated) in connection with the resulting shear stress in the viscoelastic element is subtracted from the total closing impulse energy otherwise available to excite destructive flow-induced vibration resonances in the valve, valve seat and/or pump housing. See, e.g., U.S. Pat. No. 5,158,162, incorporated by reference. Note that in viscoelastic materials, the relationship between stress and strain is time-dependent.

Preload flange adjustment changes the longitudinal compliance of the tunable valve assembly by changing the effective radius and/or the longitudinal position of the flange as it contacts the viscoelastic element's reservoir portion. This allows tuning of the valve assembly to a first assembly resonant frequency for maximizing hysteresis loss. Stated another way, by constraining a vibrating structure (i.e., a region of the viscoelastic element's reservoir portion) with the flange, it is possible to force the vibrational energy into different modes. See, e.g., U.S. Pat. No. 4,181,027, incorporated by reference.

The invention thus includes means for constraining one or more regions of the viscoelastic element. Centrally, such constraint is provided by the flange as it is adjusted radially and/or longitudinally to change compressive force on the annular constrained region. Radial adjustment is facilitated via a choice among effective flange radii and/or flange periphery configurations (e.g., cylindrical or non-cylindrical). Flange longitudinal movement is adjusted by, for example, use of mechanical screws or springs, pneumatic or electrostrictive actuation, or by heat-mediated expansion or contraction. Note that in certain embodiments, the preload flange may comprise a substantially cylindrical periphery associated with substantially longitudinal shear. Other embodiments may comprise a non-cylindrical periphery for facilitating annular shear preload having both longitudinal and transverse components associated with viscoelastic flow past the flange.

The first predetermined assembly resonant frequency of greatest interest, of course, will typically approximate one of the natural resonances of the pump housing. Further, complementary hysteresis loss and vibration spectrum narrowing may be added via a second predetermined assembly resonant frequency achieved via a circumferential tubular shear-thickening component within the viscoelastic element's groove portion. In this function of the invention, the time-varying viscosity of the shear-thickening component furnishes a constraint of the vibrating structure analogous in part to that provided by the adjustable preload flange. The result is a predetermined shift of the tunable valve assembly's vibrating mode analogous to that described above.

Note that incorporation of a circumferential tubular shear-thickening material within the viscoelastic element's groove portion increases impulse duration by slightly slowing valve closure. Increased impulse duration, in turn, narrows the closing energy impulse vibration spectrum. And the shear-thickening material itself is effectively constrained by its circumferential location within the viscoelastic element's groove portion.

The shear-thickening material (sometimes termed dilatant material) is relatively stiff near the time of impact and relatively fluid at other times. Since the viscoelastic element's groove portion strikes the valve seat before the valve body, complete valve closure is slightly delayed by the shear-thickening action. The delay effectively increases the valve closing energy impulse's duration, which means that vibration which is transmitted from the tunable valve assembly to its valve seat and pump housing has a relatively narrower spectrum and is less likely to excite vibrations that predispose a pump housing to early fatigue failure. The degree of spectrum narrowing can be tuned to minimize excitation of known pump housing resonances by appropriate choice of the shear-thickening material. Such vibration attenuation, and the associated reductions in metal fatigue and corrosion susceptibility, are especially beneficial in cases where the fluid being pumped is corrosive.

The functions of the viscoelastic element groove portion, with its circumferential shear-thickening material, are thus seen to include those of a conventional valve seal as well as those of a tuned vibration damper. See, e.g., U.S. Pat. No. 6,026,776, incorporated by reference. Further, the viscoelastic element reservoir portion, functioning with a predetermined annular shear preload provided via the adjustable preload flange, can dissipate an additional portion of closing impulse energy as heat while also damping vibration. And the viscoelastic element fenestration portions, when present, may contribute further to hysteresis loss as they elastically retain the groove portion in the seal-retention groove via linkage to the reservoir portion. Overall hysteresis loss in the viscoelastic element combines with hysteresis loss in the valve body to selectively reduce the amplitude and duration of vibrations that the closing impulse energy would otherwise tend to excite in the valve and/or pump housing.

Examples of such selective vibration reductions are seen in the interactions of the viscoelastic element reservoir portion with the adjustable preload flange. The interactions contribute to hysteresis loss in a tunable valve assembly by, for example, creating what has been termed shear damping (see, e.g., U.S. Pat. No. 5,670,006, incorporated by reference). With the preload flange adjustably fixed centrally to the valve body (e.g., fixed to the central guide stem), valve closure impact causes both the preload flange and guide stem to temporarily move distally with respect to the (peripheral) valve seat interface. The impact energy released during valve closure causes temporary deformation of the valve body; that is, the valve body periphery (e.g., the valve seat interface) being stopped by contact with the valve seat while the central portion continues (under inertial forces and pumped-fluid pressure) to elastically move distally. Thus, the annular constrained region of the viscoelastic element reservoir portion (shown constrained by the preload flange in the schematic illustrations herein) moves substantially countercurrent (i.e., in shear) relative to the annular unconstrained region (shown radially farther from the guide stem and peripheral to the preload flange). That is, relative distal movement of the preload flange thus tends to extrude the (more peripheral) annular unconstrained region proximally. Energy lost (i.e., dissipated) in connection with the resulting shear stress in the viscoelastic element is subtracted from the total closing impulse energy otherwise available to excite destructive flow-induced vibration resonances in the valve, valve seat and/or pump housing. See, e.g., U.S. Pat. No. 5,158,162, incorporated by reference.

Another aspect of the interaction of the viscoelastic element reservoir portion with an adjustable preload flange contributes to vibration damping in a tunable valve assembly. As a result of compliance in the viscoelastic element, longitudinal movement of the guide stem and preload flange results in a phase lag as shear stress develops within the viscoelastic material. This is analogous to the phase lag seen in the outer ring movement in an automotive elastomeric torsional vibration damper or the antiphase movement of small masses in an automotive pendulum vibration damper. See, e.g., the '776 patent cited above. Adjusting the shear preload flange as described above effectively changes the tunable valve assembly's compliance and thus the degree of phase lag noted above. One may thus adjust viscoelastic element preload to achieve effective vibration damping at specific frequencies of interest (e.g., pump housing resonant frequencies).

To achieve the desired hysteresis loss and vibration damping effects described herein, different portions of the viscoelastic element may be constructed to have specific elastic and/or viscoelastic properties. Note that the term elastic herein implies substantial characterization by a storage modulus, whereas the term viscoelastic herein implies substantial characterization by a storage modulus and a loss modulus. See, e.g., the '006 patent cited above.

Specific desired properties for each viscoelastic element portion arise from a design concept requiring coordinated functions depending on the location of each portion. The viscoelastic element reservoir portion affects hysteresis associated with longitudinal compliance of the tunable valve assembly because it viscoelasticly accommodates longitudinal deformation of the valve body toward a concave shape. Hysteresis in the viscoelastic element groove portion (related, e.g., to its valve seal and vibration damping functions) and the valve body itself further reduces closing energy impulse amplitude through dissipation of portions of closing impulse energy as heat.

Elastic longitudinal compliance of a tunable valve assembly results in part from elastic properties of the materials comprising the tunable valve assembly. Such elastic properties may be achieved through use of composites as, for example, in an elastic valve body comprising steel, carbon fiber reinforced polymer, carbon nanotube reinforced polymer, and/or carbon nanotube reinforced metal matrix. The polymer may comprise a polyaryletherketone (PAEK), for example, polyetheretherketone (PEEK). See, e.g., U.S. Pat. No. 7,847,057 B2, incorporated by reference.

The description herein of valve body flexure as concave-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from the traditional frusto-conical shape to a convex curved shape (which may include circular, elliptic and/or parabolic portions), a correspondingly-curved concave valve seat may be used. Such rolling contact, when present, augments elastic formation of the concave valve body flexure on the pump pressure stroke, reversing the process on the suction stroke.

The circular rolling contact described herein may be visualized by considering the behavior of the convex valve seat interface as the valve body experiences concave flexure (i.e., the transformation from a relatively flat shape to a concave shape). During such flexure the periphery of the valve seat interface rotates slightly inwardly and translates slightly proximally (relative to the valve body's center of gravity) to become the proximal rim of the concave-shaped flexure.

While substantially elastic, each such valve body flexure is associated with energy loss from the closing energy impulse due to hysteresis in the valve body. Frictional heat loss (and any wear secondary to friction) associated with any circular rolling contact of the convex valve seat interface with the concave valve seat is intentionally relatively low. Thus, the rolling action, when present, minimizes wear that might otherwise be associated with substantially sliding contact of these surfaces. Further, when rolling contact between valve body and valve seat is present during both longitudinal valve body flexure and the elastic rebound which follows, trapping of particulate matter from the pumped fluid between the rolling surfaces tends to be minimized.

In addition to the above described energy dissipation (associated with hysteresis secondary to valve body flexure), hysteresis loss will also occur during pressure-induced movements of the viscoelastic element groove portion (in association with the valve seal function). Note that pumped fluid pressure acting on a valve comprising the invention's tunable valve assembly will hydraulically pressurize substantially all of the viscoelastic element's groove and reservoir portions (through its direct effects on the groove portion and on the unconstrained region of the reservoir portion). Although polymers suitable for use in the viscoelastic element generally are relatively stiff at room ambient pressures and temperatures, the higher pressures and temperatures experienced during pump pressure strokes tend to cause even relatively stiff polymers to behave like fluids which can transmit pressure hydraulically. Thus, a viscoelastic element portion in a peripheral seal-retention groove is periodically hydraulically pressurized, thereby increasing its sealing function during the high-pressure portion of the pump cycle. Hydraulic pressurization of the same viscoelastic element portion is reduced during the low-pressure portion of the pump cycle when the sealing function is not needed.

Another aspect of the formation of a concave valve body flexure under the influence of a closing energy impulse is that the momentum of pumped fluid which moves in contact with the tunable valve assembly is smoothly redirected (at least in part) laterally and proximally. Forces due to oppositely directed radial components of the resultant fluid flow tend to cancel, and energy lost as heat in pumped fluid turbulence is subtracted from that of the closing energy impulse, thus decreasing its amplitude.

Because of the above-described energy loss and the time required for valve body longitudinal deformation to take place, with the associated dissipation of closing impulse energy described above, a closing energy impulse applied to a tunable valve assembly is relatively lower in amplitude and longer in duration (i.e., having a longer rise time) than an analogous closing energy impulse applied to a conventionally stiff valve body which closes on a conventional frusto-conical valve seat. The combination of lower amplitude and increased duration of the closing energy impulse results in a narrowed characteristic vibration bandwidth having reduced potential for induction of damaging resonances in the valve, valve seat, and adjacent portions of the pump housing. See, e.g., the above-cited '242 patent.

In continuous pump operation, repetitive elastic longitudinal compression and valve body flexure are followed by elastic rebound under the influence of a series of relatively brief closing energy impulses. Cumulative energy loss in the form of heat (e.g., hysteresis loss plus friction loss) is continuously transported for redistribution within the valve body and eventual rejection to the valve body surroundings (including, e.g., the pumped fluid). This heat, which is substantially lost to the valve body surroundings, represents a reduction in the energy content (and thus the damage-causing potential) of the closing energy impulse applied to the valve body.

Note that in describing the fluid-like behavior of certain polymers herein under elevated heat and pressure, the term "polymer" includes relatively homogenous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension) to improve heat scavenging and/or other properties. See, e.g., U.S. Pat. No. 6,432,320 B1, incorporated by reference.

In addition to heat scavenging, damping is a function of portions of viscoelastic element embodiments of the invention. Optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Note also that vibration attenuation in a tunable valve assembly of the invention operates via four interacting mechanisms. First, impulse amplitude is reduced by converting a portion of total closing impulse energy to heat, which is then ultimately rejected to the valve body surroundings (e.g., the pumped fluid). Each such reduction of impulse amplitude means lower amplitudes in the characteristic vibration spectrum transmitted to the pump housing.

Second, impulse duration at the valve seat is lengthened by the cycle time associated with valve seal compression, concave valve body flexure and elastic rebound. Each such lengthening of impulse duration results in a corresponding reduction of the impulse's characteristic bandwidth (and thus reduction of the damage potential of induced vibrations). In other words, bandwidth narrowing is achieved in embodiments of the invention through an increase of the effective impulse duration due to slowing the impulse's rise time as the valve assembly's components flex and relax over a finite time interval.

Third, induced vibration resonances of the tunable valve assembly, valve seat, and/or pump housing structures are effectively damped by interactions generating turbulence (and thus dissipating heat) in the pumped fluid.

And fourth, the potential for excitation of damaging resonances in pump vibration induced by a closing energy impulse is further reduced through narrowing of the impulse's characteristic vibration bandwidth by increasing the valve body's effective inertia without increasing its actual mass. Such an increase of effective inertia is possible because a portion of pumped fluid moves with the valve body as it flexes and/or longitudinally compresses. The mass of this portion of pumped fluid is effectively added to the valve body's mass during the period of flexure/relaxation, thereby increasing the valve body's effective inertia.

To increase understanding of the invention, three embodiments are discussed herein only as illustrative examples. In a first invention embodiment a tunable valve assembly is described as comprising a valve body, an adjustable preload flange, and a viscoelastic element. The valve body comprises a peripheral groove spaced apart by a reservoir from a central longitudinal guide stem. The viscoelastic element is integrated with the valve body and comprises a reservoir (or central) portion coupled to a groove (or peripheral) portion, the groove portion comprising at least one circumferential tubular area containing shear-thickening material. The adjustable preload flange extends radially from the central guide stem over about 20% to about 80% of said viscoelastic element reservoir portion for imposing an adjustable annular shear preload to achieve at least a first predetermined assembly resonant frequency. And each circumferential tubular area is substantially filled with at least one shear-thickening material chosen to achieve at least a second predetermined assembly resonant frequency.

If, as shown for example herein, the valve body has a guide stem centered in the reservoir, the reservoir itself has an annular shape centered on the guide stem. Fenestrations, when present in the groove wall, may be equally spaced, being symmetrically arranged as shown herein. At least a portion of each fenestration may have a transverse area which increases with decreasing radial distance to said longitudinal axis. That is, each fenestration flares to greater transverse areas in portions closer to the longitudinal axis, relative to the transverse areas of portions of the fenestration which are more distant from the longitudinal axis. Thus, a flared fenestration is partly analogous to a conventionally flared tube, with possible differences arising from the facts that (1) fenestrations are not limited to circular cross-sections, and (2) the degree of flare may differ in different portions of a fenestration.

As noted above, the valve seat interface may have a convex curve to facilitate rolling contact with a valve seat. If it has a convex curve, the valve seat interface may have circular, elliptic and/or parabolic portions to match optionally corresponding portions on a mating valve seat. Such optional matching will tend to reduce wear and improve the rolling seal between valve seat interface and valve seat.

In a second invention embodiment a tunable valve assembly comprises a valve body substantially symmetrical about a longitudinal axis, the valve body having a peripheral groove spaced apart from a central longitudinal guide stem by a reservoir. A viscoelastic element is integrated with the groove and the reservoir. An adjustable preload flange is coupled to the guide stem and contacts the viscoelastic element in the reservoir for imposing an adjustable annular constraint on the viscoelastic element to achieve at least a first predetermined assembly resonant frequency. The tunable valve assembly may additionally comprise at least one circumferential tubular area in the viscoelastic element in the groove, each tubular area being substantially filled with at least one shear-thickening material chosen to achieve at least a second predetermined assembly resonant frequency.

The valve assembly of the second embodiment may be incorporated in a valve to be installed in a pump, the pump having a resonant frequency substantially equal to the first predetermined assembly resonant frequency. This combination would be an application of the invention's second embodiment. The valve assembly of the second embodiment may, also or alternatively, be installed in a pump having a resonant frequency substantially equal to the second predetermined assembly resonant frequency. This combination would be yet another application of the invention's second embodiment.

The flange may or may not be longitudinally fixed to the guide stem. And at least one additional flange may be added to the above second invention embodiment to form one or more dependent embodiments. Any such additional flange(s) extend radially from the guide stem and may or may not be longitudinally fixed to the guide stem for achieving a predetermined assembly resonant frequency.

Further, a tunable valve assembly of the second invention embodiment may comprise a viscoelastic element comprising at least one polymer composite. The polymer composite may be described as comprising PAEK, PEEK, and/or various urethane-based polymers.

In certain invention embodiments, a viscoelastic element comprising at least one polymer composite is integrated with a corresponding tunable valve assembly of the second invention embodiment, the viscoelastic element's fenestration portions (functioning as radial tension members) lie within the fenestrations. Radial tension members then connect the viscoelastic element's groove portion (i.e., an annular outer portion lying at least partially within a peripheral seal-retention groove) with the viscoelastic element's reservoir portion (i.e., a central portion lying at least partially within the reservoir). Normal curing of the polymer composite(s) comprising the viscoelastic element's central portion is associated with shrinkage which will tend to put the radial members in tension. This tension, which is schematically illustrated herein, will tend to firmly anchor the continuous polymer element's annular outer portion firmly within the peripheral seal-retention groove without the use of adhesives and/or serrations as have been commonly used in anchoring conventional valve seals.

In a third invention embodiment, a tunable valve assembly comprises a valve body substantially symmetrical about a longitudinal axis, an adjustable preload flange centrally coupled to the valve body, and a viscoelastic element. The valve body comprises a peripheral groove coupled to a central reservoir. The viscoelastic element is integrated with valve body as described above; it comprises a groove portion coupled to a reservoir portion, the groove portion comprising at least one circumferential tubular area. Each circumferential tubular area is substantially filled with at least one shear-thickening material chosen to achieve at least a first predetermined assembly resonant frequency. The adjustable preload flange may contact a region of the viscoelastic element reservoir portion to constrain that region for achieving at least a second predetermined assembly resonant frequency.

The adjustable preload flange noted above may have a non-cylindrical periphery to provide expressly for generation of transverse shear in the viscoelastic element. Such an invention embodiment provides for damping of transverse as well as longitudinal vibration. Transverse vibration may originate, for example, when slight valve body misalignment with the valve seat causes abrupt lateral valve body movement during valve closing.

The valve assembly of the third embodiment may be installed in a pump housing, the pump housing having a housing resonant frequency substantially equal to the first predetermined resonant frequency. This combination would be an application of the invention's third embodiment. The valve assembly of the third embodiment may, additionally or alternatively, be installed in a pump having a pump resonant frequency substantially equal to the first or second predetermined resonant frequency. This combination would be yet another application of the invention's third embodiment.

As noted above, various invention embodiments may comprise carbon fiber reinforced polymer, and the polymer may comprise PAEK. In the latter case, the polymer may comprise PEEK. Such an embodiment, combining high strength with flexibility and relatively light weight, demonstrates the beneficial effects described above.

Note that in addition to the example embodiments described herein, still other alternative invention embodiments exist, including valves, pump housings and pumps comprising one or more of the example embodiments or equivalents thereof. During fabrication, internal valve body spaces may be formed by welding (e.g., inertial welding or laser welding) valve body portions together as in the above-cited '837 patent, or by separately machining such spaces with separate coverings. Valve body fabrication may also be by rapid-prototyping (i.e., layer-wise) techniques. See, e.g., the above-cited '057 patent. An viscoelastic element may be cast and cured in place in a valve body as described herein. See, e.g., U.S. Pat. No. 7,513,483 B1, incorporated by reference.

DETAILED DESCRIPTION

Figure 1:
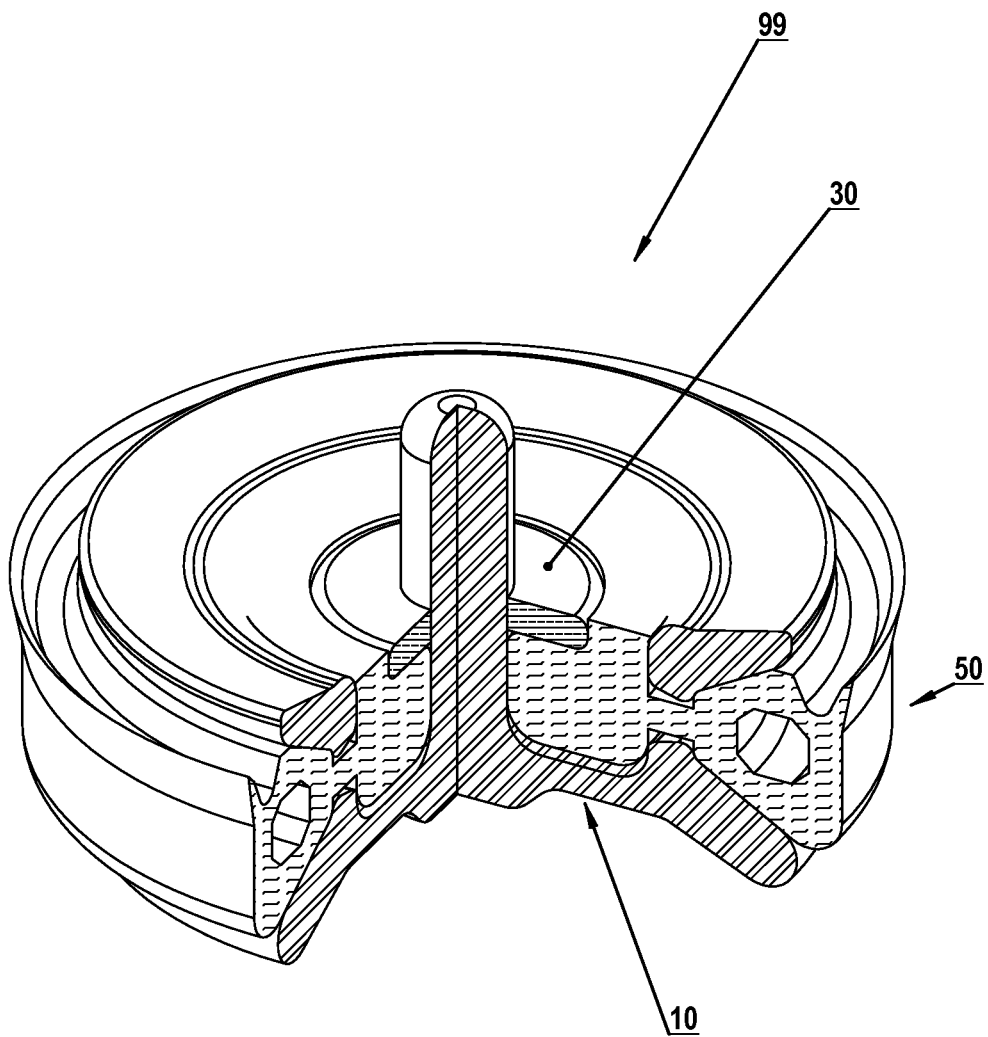
FIG. 1 is a schematic 3-dimensional view of a partially sectioned tunable valve assembly showing how an adjustable preload flange contacts a region of the reservoir portion of a viscoelastic element as described herein.

FIG. 1 schematically illustrates a first invention embodiment of a tunable valve assembly 99. Valve assembly 99 comprises a valve body 10, an adjustable preload flange 30, and a viscoelastic element 50. Valve body 10, in turn, comprises a (peripheral) groove 12 (see FIG. 2) spaced apart by a (central) reservoir 16 from a (longitudinal) guide stem 14. Viscoelastic element 50 is integrated with valve body 10 and comprises a (central) reservoir portion 52 coupled to a (peripheral) groove portion 54 by a plurality of radial fenestration portions 56. Groove portion 54 functions as a valve seal and comprises at least one circumferential tubular area 58.

Figure 2:
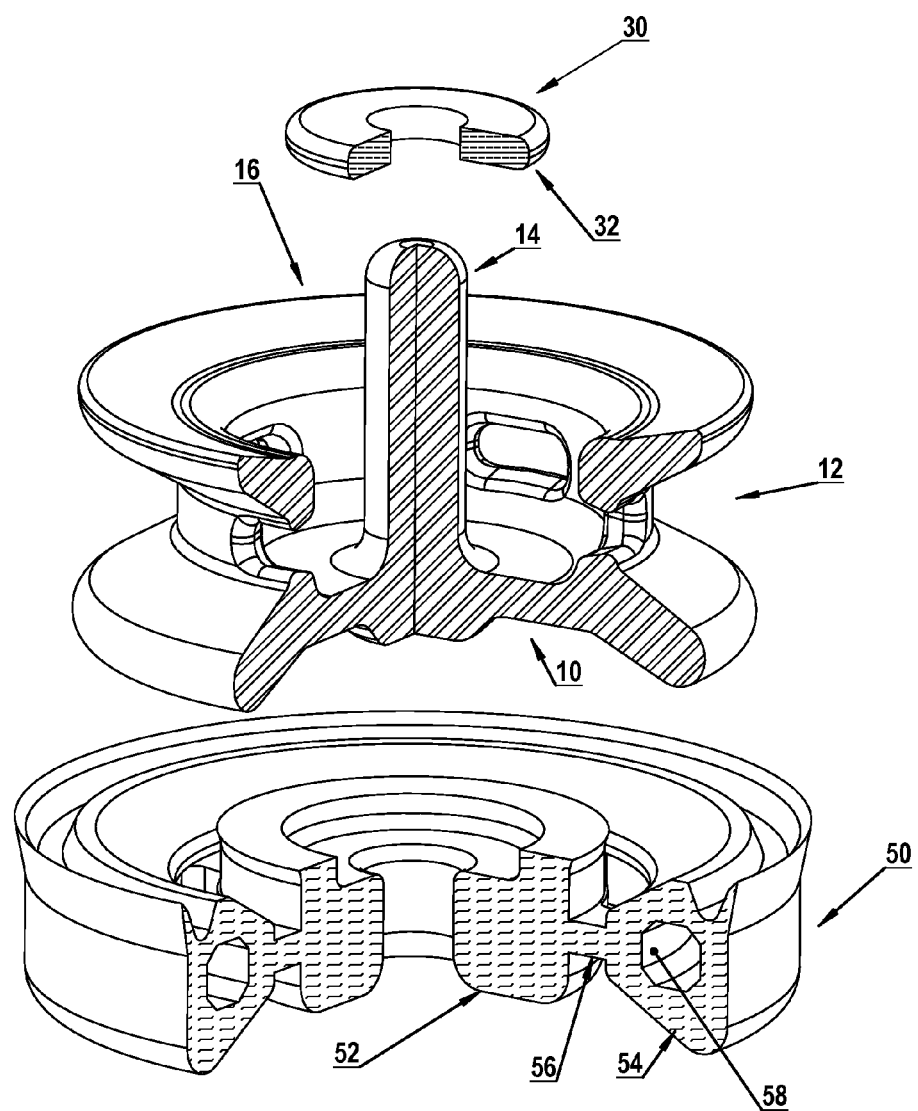
FIG. 2 includes a schematic 3-dimensional exploded view of the tunable valve assembly of FIG. 1 showing the viscoelastic element, the valve body, and the adjustable preload flange.
Figure 3:
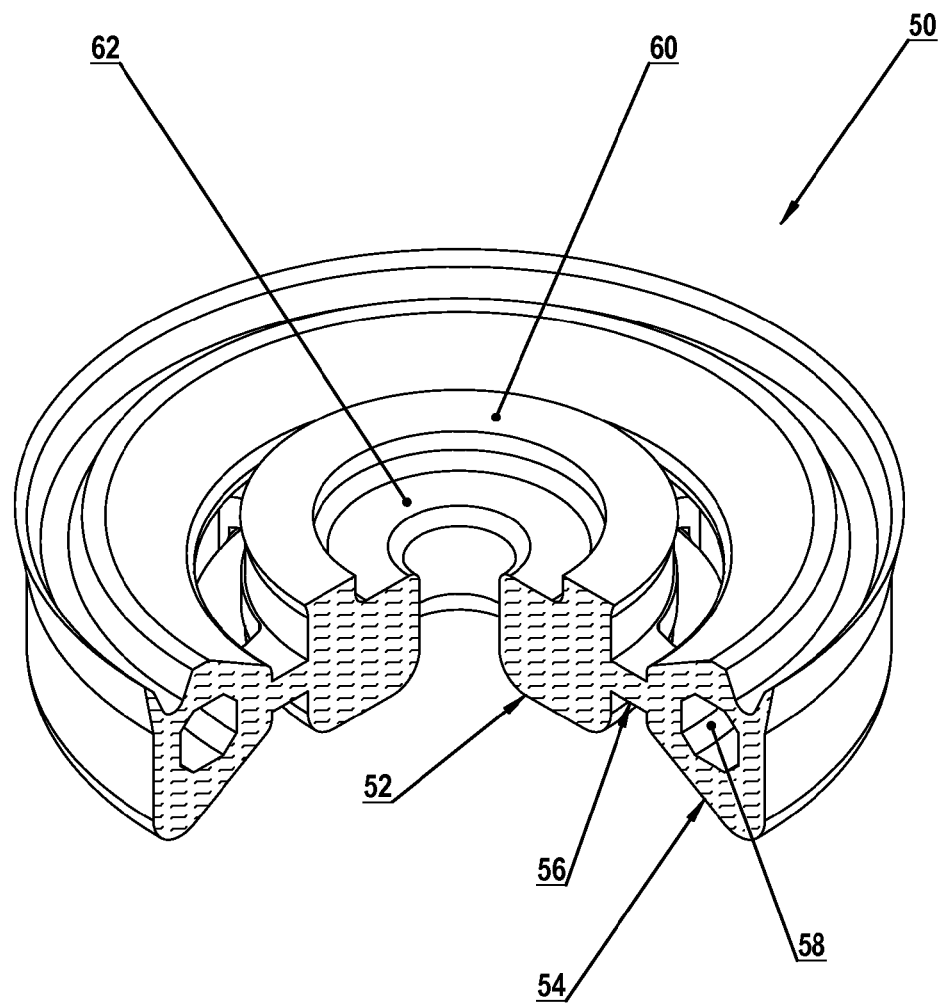
FIG. 3 is a schematic 3-dimensional partially-sectioned view of a viscoelastic element showing, among other things, the constrained region of the element where it contacts an adjustable preload flange.

Referring to FIGS. 1-3, adjustable preload flange 30 extends radially from guide stem 14 over about 20% to about 80% of viscoelastic element reservoir portion 52 (see FIG. 3). Adjustable preload flange 30 thus imposes an adjustable annular shear preload over an annular constrained region 62 of viscoelastic element reservoir portion 52 to achieve at least a first predetermined assembly resonant frequency. Note that an adjacent annular unconstrained region 60 of viscoelastic element reservoir portion 52 remains open to pumped fluid pressure. Note also that adjustable preload flange 30 may be adjusted in effective radial extent and/or longitudinal position.

Note further that annular constrained region 62 and annular unconstrained region 60 are substantially concentric and adjacent. Thus, as longitudinal (i.e., distal) compressive restraint is applied via preload flange 30 to annular constrained region 62, annular unconstrained region 60 will tend to move (i.e., extrude) proximally. The oppositely-directed (i.e., countercurrent) movements of constrained and unconstrained annular regions of central viscoelastic portion 52 create a substantially annular region of shear stress.

Figure 5:
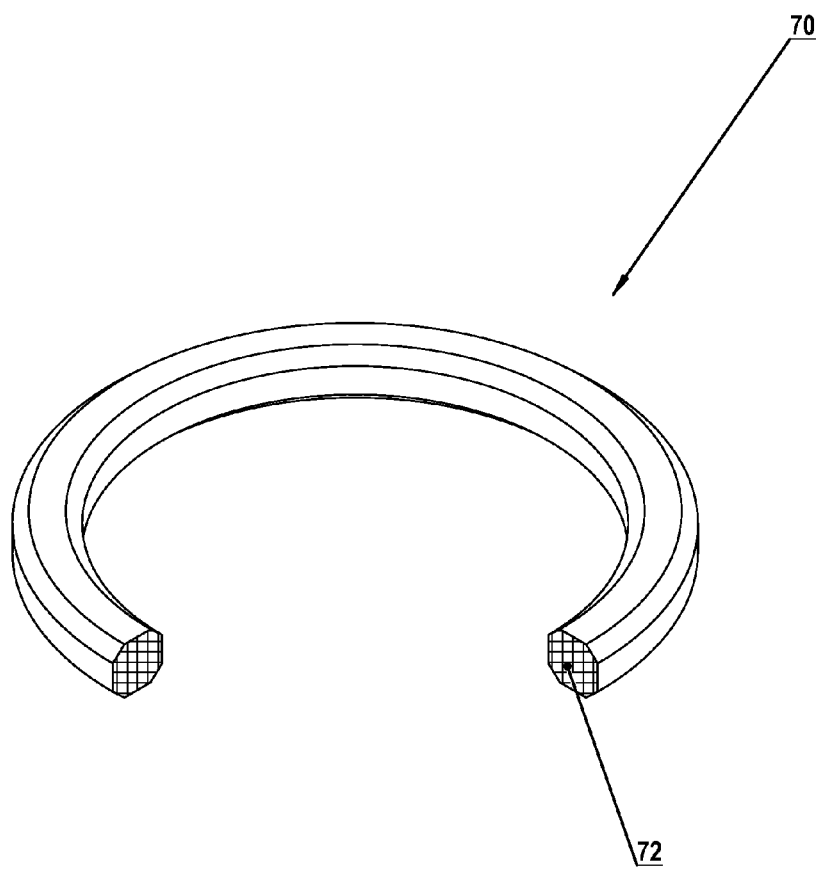
FIG. 5 is a schematic 3-dimensional instantaneous partially-sectioned view of shear-thickening material which would substantially fill a circumferential tubular area in the groove portion of a viscoelastic element.

Finally, each circumferential tubular area 58 is substantially filled with at least one shear-thickening material 70 (see FIG. 5) chosen to achieve at least a second predetermined assembly resonant frequency. Note that FIG. 5 schematically represents a partially-sectioned view of an instantaneous configuration of the shear-thickening material 70 within circumferential tubular area 58.

In a second invention embodiment a tunable valve assembly 99 comprises a valve body 10 substantially symmetrical about a longitudinal axis, valve body 10 having a peripheral groove 12 spaced apart from a (central longitudinal) guide stem 14 by a reservoir 16. A viscoelastic element 50 (having reservoir portion 52 coupled to a groove portion 54 via fenestration portions 56) is integrated with groove 12 and reservoir 16. An adjustable preload flange 30 is coupled to guide stem 14 and contacts viscoelastic element 50 in reservoir 16 to impose an adjustable annular constraint on viscoelastic element 50 for achieving at least a first predetermined assembly resonant frequency. Such adjustable annular constraint imposes an adjustable shear preload between constrained annular region 62 and unconstrained annular region 60. Tunable valve assembly 99 may additionally comprise at least one circumferential tubular area 58 in groove portion 54 of viscoelastic element 50 residing in groove 12, each tubular area 58 being substantially filled with at least one shear-thickening material 70 chosen to achieve at least a second predetermined assembly resonant frequency.

The valve assembly of the second embodiment may be installed in a pump housing having a measured housing resonant frequency; the measured housing resonant frequency may then be substantially replicated in the first predetermined resonant frequency of the tunable valve assembly. Such a combination would be an application of the invention's second embodiment. An analogous tuning procedure may be followed if the tunable valve assembly of the second embodiment is installed in a pump having a (similar or different) resonant frequency substantially equal to the second predetermined resonant frequency. This combination would be yet another application of the invention's second embodiment.

In a third invention embodiment, tunable valve assembly 99 comprises a valve body 10 substantially symmetrical about a longitudinal axis, an adjustable preload flange 30 centrally coupled to valve body 10, and a viscoelastic element 50. Valve body 10 comprises a (peripheral) groove 12 coupled to a (central) reservoir 16. Viscoelastic element 50 is integrated with valve body 10 and comprises a groove portion 54 coupled to a reservoir portion 52, groove portion 54 comprising at least one circumferential tubular area 58. Each circumferential tubular area 58 is substantially filled with at least one shear-thickening material 70 chosen to achieve at least a first predetermined assembly resonant frequency. Additionally, adjustable preload flange 30 may contact a region (e.g., constrained region 62, adjacent to unconstrained region 60) of the viscoelastic element reservoir portion 52 to constrain region 62 for achieving at least a second predetermined assembly resonant frequency. Note that preload flange 30 may have a non-cylindrical periphery 32 for imposing on viscoelastic element reservoir portion 52 an adjustable annular shear preload having both longitudinal and transverse components.

Figure 4:
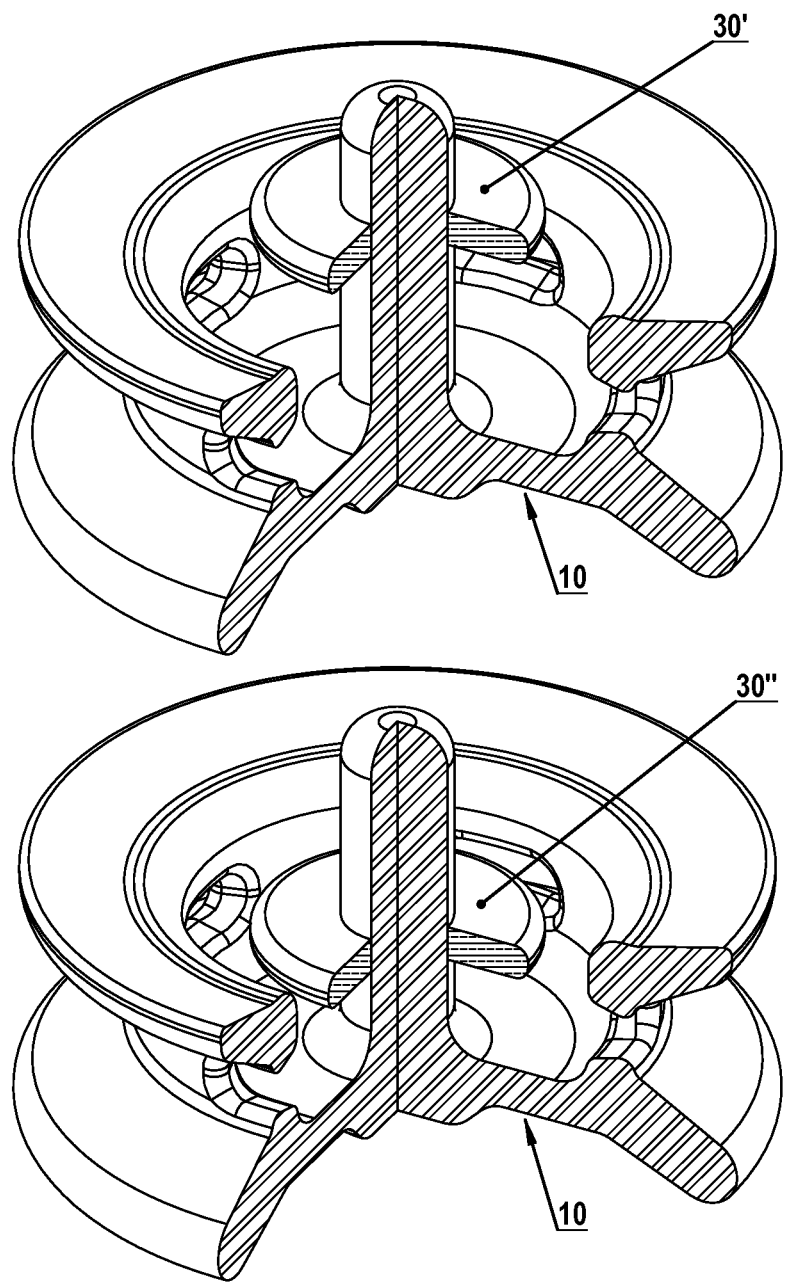
FIG. 4 is a schematic 3-dimensional partially-sectioned view of two valve bodies with an adjustable preload flange located at different longitudinal positions on a central guide stem.

Note further that the periphery of adjustable preload flange 30, if cylindrical, predisposes a tunable valve assembly to substantially longitudinal shear damping with each longitudinal distortion of valve body 10 associated with valve closure. In contrast, as shown in FIG. 4, the periphery of a longitudinally adjusted preload flange 30' or 30" may introduce shear damping of variable magnitude and having both longitudinal and transverse components. Such damping may be beneficial in cases where significant transverse valve-generated vibration occurs.

To clarify the placement of viscoelastic element 50, labels indicating the portions are placed on a sectional view in FIGS. 2 and 3. Actual placement of viscoelastic element 50 in valve body 10 (see FIG. 1) may be by, for example, casting a viscoelastic element 50 in place, or placing a viscoelastic element 50 (which has been precast) in place during layer-built or welded fabrication. The tunable valve assembly embodiment of the invention is intended to represent valve body 10 and viscoelastic element 50 components at any stage of manufacture leading to functional integration of the two components.

To enhance scavenging of heat due to friction loss and/or hysteresis loss, shear-thickening material 70 and/or viscoelastic element 50 may comprise one or more polymers which have been augmented with nanoparticles 72 (see FIG. 5). Nanoparticles are generally invisible to the eye as they are typically dispersed in a colloidal suspension. Hence, they are schematically represented by cross-hatching 72 in FIG. 5. Nanoparticles may comprise, for example, carbon and/or metallic materials such as copper, beryllium, titanium, nickel, iron, alloys or blends thereof. The term nanoparticle may conveniently be defined as including particles having an average size of up to about 2000 nm. See, e.g., the '320 patent.

What is claimed is:

1. A method of tuning a valve assembly, wherein said valve assembly comprises a valve body, an adjustable preload flange, and a viscoelastic element, said valve body comprising a peripheral groove spaced apart from a central longitudinal guide stem by a reservoir;

wherein said viscoelastic element comprises a reservoir portion disposed in said reservoir, coupled to a groove portion disposed in said peripheral groove, said groove portion comprising at least one circumferential tubular area;

wherein said adjustable preload flange applies annular constraint on said viscoelastic element reservoir portion;

wherein the method comprises the steps of:
adjusting said preload flange to achieve a first assembly predetermined resonant frequency substantially replicating a measured resonant frequency; and
substantially filling said circumferential tubular area with at least one shear-thickening material having a second predetermined assembly resonant frequency;
wherein said first and second predetermined assembly resonant frequencies are different; and
wherein said adjusting of the preload flange and said filling of said circumferential tubular area attenuates valve assembly generated vibrations.

2. The method of tuning a valve assembly of claim 1 wherein said viscoelastic element comprises polyurethane.

3. The method of tuning a valve assembly of claim 1 wherein said viscoelastic element comprises a plurality of polymers having macroscopically phase-separated morphologies.

4. The method of tuning a valve assembly of claim 1 wherein said viscoelastic element comprises a plurality of polymers and has a microheterogeneous morphology.

5. The method of tuning a valve assembly of claim 1 wherein said viscoelastic element comprises a plurality of polymers forming at least one interpenetrating polymer network.

6. The method of tuning a valve assembly of claim 1 wherein said viscoelastic element groove portion comprises a plurality of shear-thickening materials.

7. A method of tuning a valve assembly, wherein valve assembly comprises a valve body substantially symmetrical about a longitudinal axis, said valve body having a peripheral groove spaced apart from a central longitudinal guide stem by a reservoir;
   wherein a viscoelastic element is disposed in said groove and said reservoir; and
   wherein an adjustable preload flange constrains said viscoelastic element having a plurality of predetermined assembly resonant frequencies;
   wherein the method comprises:
      longitudinally adjusting said adjustable preload flange for optimal damping at a first assembly resonant frequency;
      wherein said first assembly resonant frequency substantially replicates a measured resonant frequency; and
      wherein said adjusting of the preload flange attenuates valve assembly generated vibrations.

8. The method of tuning a valve assembly of claim 7 wherein said viscoelastic element comprises polyurethane.

9. The method of tuning a valve assembly of claim 7 additionally comprising at least one circumferential tubular area in said viscoelastic element disposed in said groove, each said tubular area being substantially filled with at least one shear-thickening material having at least a second predetermined assembly resonant frequency different from said measured resonant frequency.

10. A method of tuning a valve assembly, wherein valve assembly comprises a valve body substantially symmetrical about a longitudinal axis, an adjustable preload flange centrally coupled to said valve body, and a viscoelastic element;
   wherein said valve body comprises a peripheral groove coupled to a central reservoir;
   wherein said viscoelastic element comprises a groove portion disposed in said peripheral groove and coupled to a reservoir portion disposed in said central reservoir, said groove portion comprising at least one circumferential tubular area; and
   wherein the method comprises:
      substantially filling said circumferential tubular area with at least one shear-thickening material having a plurality of predetermined assembly resonant frequencies;
      wherein one of said predetermined assembly resonant frequencies substantially replicates a measured resonant frequency; and
      wherein said filling of said circumferential tubular area attenuates valve generated vibrations.

11. The method of tuning a valve assembly of claim 10 wherein said adjustable preload flange constrains a region of said viscoelastic element reservoir portion having at least a second predetermined assembly resonant frequency different from said measured resonant frequency.

\* \* \* \* \*